US007358944B2

(12) United States Patent
Yeh

(10) Patent No.: US 7,358,944 B2
(45) Date of Patent: Apr. 15, 2008

(54) METHOD AND SYSTEM FOR REDUCING RESIDUAL IMAGE EFFECT OF LIQUID CRYSTAL DISPLAY AFTER TURNED OFF

(75) Inventor: Liang-Hua Yeh, San Chung (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 587 days.

(21) Appl. No.: 10/825,650

(22) Filed: Apr. 16, 2004

(65) Prior Publication Data

US 2005/0231491 A1 Oct. 20, 2005

(51) Int. Cl.
*G09G 3/36* (2006.01)
*G09G 5/00* (2006.01)
*G06F 3/038* (2006.01)

(52) U.S. Cl. ........................................ 345/87; 345/211

(58) Field of Classification Search .................. 345/87, 345/99, 211-213, 102
See application file for complete search history.

(56) References Cited

U.S. PATENT DOCUMENTS 6,081,902 A * 6/2000 Cho ........................... 713/330
6,271,812 B1 * 8/2001 Osada et al. .................. 345/76
6,621,489 B2 * 9/2003 Yanagisawa et al. ....... 345/211
7,109,965 B1 * 9/2006 Lee et al. ...................... 345/98
2003/0189564 A1 * 10/2003 Lee et al. .................. 345/212

* cited by examiner

*Primary Examiner*—Amr A. Awad
*Assistant Examiner*—Steven E Holton
(74) *Attorney, Agent, or Firm*—Pillsbury Winthrop Shaw Pittman, LLP

(57) ABSTRACT

A system for reducing the residual image effect of a liquid crystal display after turned off is described, which includes a timing controller, a source driver, a gate driver, and a plurality of thin film transistors on the panel of the liquid crystal display. The system first transmits an image signal to the panel of the liquid crystal display by means of the timing controller in a period of time from when a backlight of the liquid crystal display is turned off to when an image data transmission is turned off. The system then transmits a control signal to the gate driver through the timing controller to turn on all the thin film transistors during a period of time from when the image data transmission is turned off to when the power to the liquid crystal display is turned off. Therefore, residual electric charges in the thin film transistors are discharged rapidly via a plurality of source lines of the source driver, and the residual image effect is consequently diminished.

15 Claims, 3 Drawing Sheets

METHOD AND SYSTEM FOR REDUCING RESIDUAL IMAGE EFFECT OF LIQUID CRYSTAL DISPLAY AFTER TURNED OFF

FIELD OF THE INVENTION

The present invention relates to a method and a system for reducing the residual image effect of a display, and more particularly, to a method and a system for reducing the residual image effect of a liquid crystal display after turned off.

BACKGROUND OF THE INVENTION

Opto-electronics technologies have recently progressed by leaps and bounds due to the coming of the digital era, which also has stimulated the market for liquid crystal displays (LCDs). Liquid crystal displays possess many advantages, such as, for example, high display quality, small volume occupation, light weight, low driving voltage, and low power consumption. Therefore, liquid crystal displays are gradually replacing conventional cathode ray tube (CRT) displays and are applied widely to 3C (computers, communications, and consumer electronic) products, for example, personal digital assistants (PDAs), cellular phones, video recording units, notebook computers, desktop monitors, vehicular monitors, and projective televisions.

In general, the steps of turning off a liquid crystal display are controlled to turn off the backlight of the liquid crystal display, image data transmission, and power, in sequence. However, a residual image lingers for as long as several seconds on the panel of the liquid crystal display after the power is turned off. The phenomenon not only confuses users, but also impairs the display quality of the panel for a period of time. The residual image effect of a thin film transistor liquid crystal display (TFT-LCD), for example, is caused by the slow discharge rate of pixel electrodes of the thin film transistor liquid crystal display. As a result, charges in the pixel electrodes cannot discharge completely after power to the thin film transistor liquid crystal display is turned off. Consequently, complete discharge of residual charges in a liquid crystal cell or in capacitors takes longer.

Traditionally, the residual image effect is improved by modifying the manufacturing method of the liquid crystal displays. FIG. 1 shows an equivalent circuit diagram of a conventional thin film transistor liquid crystal display after turned off. Referring to FIG. 1, charges in a capacitor ($C_{LCD}$) may discharge more quickly due to the lower resistance of a resistor ($R_{off}$) adjusted by modifying the manufacturing method. However, decreasing the resistance of the resistor ($R_{off}$) inevitably leads to high current ($I_{off}$) according to the Ohm's law, which also results in a high leakage current in normal operation of the thin film transistor liquid crystal display.

SUMMARY OF THE INVENTION

It is therefore the objective of the present invention to provide a method and a system for reducing the residual image effect of a liquid crystal display after turned off, which enable faster and more efficient discharge of charges without inducing a high leakage current.

According to the aforementioned objective of the present invention, on the one hand, a system for reducing the residual image effect of a liquid crystal display after turned off is provided. The system provides a fast discharging route for charges, so as to reduce residual charges in the liquid crystal display.

According to the aforementioned objective of the present invention, on the other hand, a method for reducing the residual image effect of a liquid crystal display after turned off is provided, by which the residual image effect is diminished without incurring a high leakage current.

In accordance with a preferred embodiment of the present invention, a timing controller transmits an image signal to the panel of a liquid crystal display first in a period of time from when a backlight of the liquid crystal display is turned off to when image data transmission is turned off, in which voltage of the image signal is substantially close to the voltage of a common voltage generator. Then, the timing controller transmits a control signal to a gate driver of the liquid crystal display to turn on a plurality of thin film transistors during a period of time from when the image data transmission is turned off to when the power of the liquid crystal display is turned off. As a result, residual charges in the thin film transistors are discharged rapidly through a plurality of source lines of a source driver of the liquid crystal display. Hence, the residual image effect resulting from the residual charges is improved greatly without bringing about a high leakage current.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PREFERRED EMBODIMENTS

An embodiment in accordance with the present invention is disclosed in details as following, taking in conjunction with the accompanying drawings. For reducing the residual image effect and for avoiding a high leakage current induced by modifying manufacturing processes of liquid crystal displays, a method through controlling signals is employed in accordance with the present invention. In this method, the voltage of thin film transistors of the liquid crystal displays is substantially close to the voltage of a common voltage generator, and hence residual charges in the thin film transistors can discharge rapidly.

Figure 1:
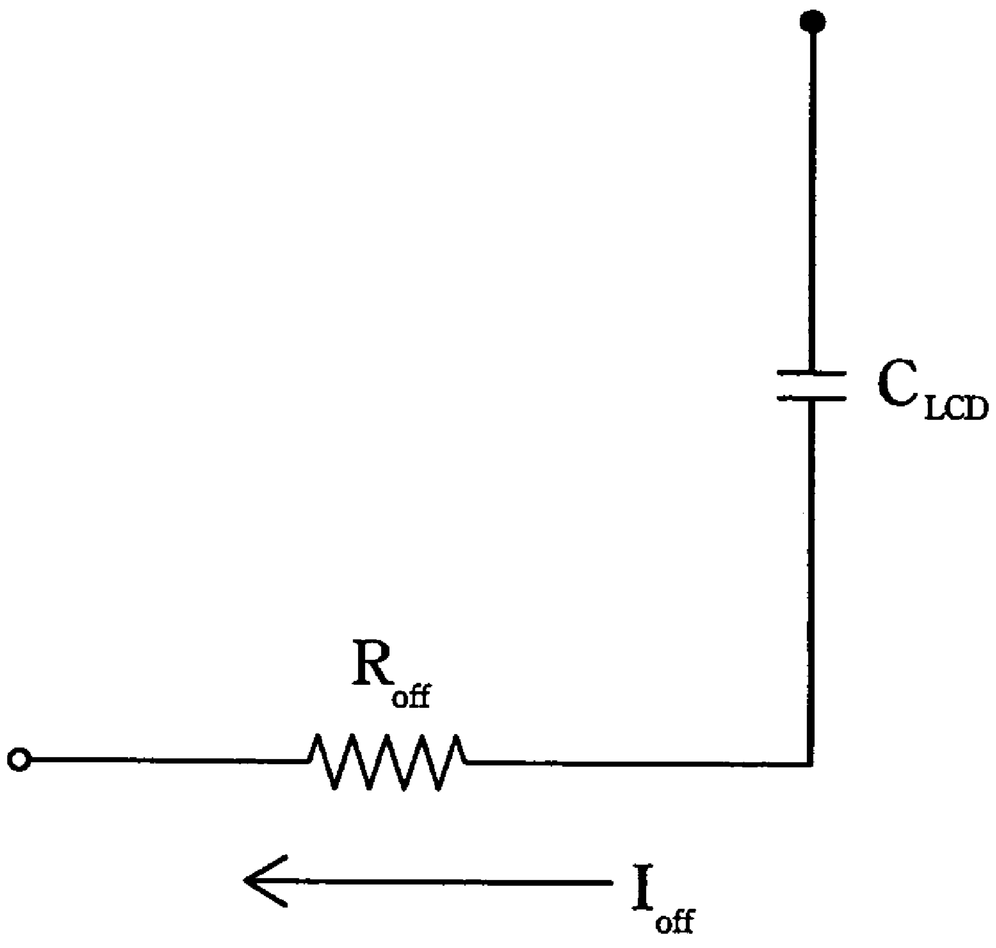
FIG. 1 (PRIOR ART)
FIG. 1 illustrates an equivalent circuit diagram of a conventional thin film transistor liquid crystal display after power to the same is turned off.
Figure 2:
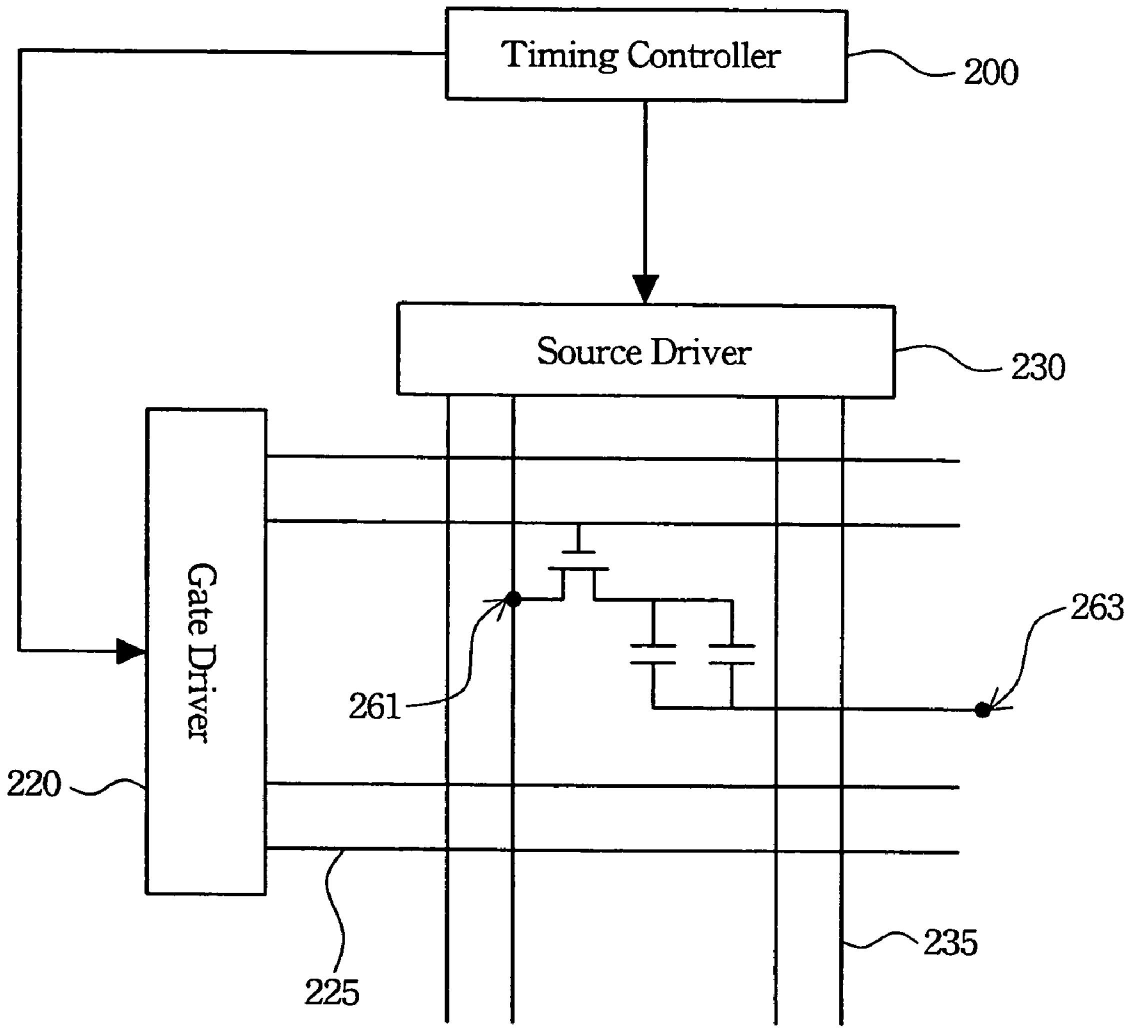
FIG. 2 illustrates a system diagram for reducing the residual image effect of a liquid crystal display after the same is turned off in accordance with the preferred embodiment of the present invention.

FIG. 2 illustrates a system diagram for reducing the residual image effect of a liquid crystal display after the same is turned off in accordance with the preferred embodiment of the present invention. The system has a timing controller 200 and a display array circuit electrically coupled with the timing controller 200 on a panel of the liquid crystal display as shown in FIG. 2. The display array circuit usually includes a gate driver 220 with a plurality of gate lines 225, a source driver 230 with a plurality of source lines 235, and a plurality of thin film transistors electrically coupled to the gate driver 220 and the source driver 230. On the other hand, the steps of turning off the liquid crystal display are controlled by the system to turn off a backlight, an image data transmission, and a power thereof in sequence. A first period of time from when the backlight of the liquid crystal display is turned off to when the image data transmission is turned off generally takes a frame time, i.e. about $16.7\times10^{-3}$ seconds. A second period of time from when the image data transmission is turned off to when the power of the liquid crystal display is turned off usually takes a line time, for example around $20\times10^{-6}$ seconds.

Figure 3:
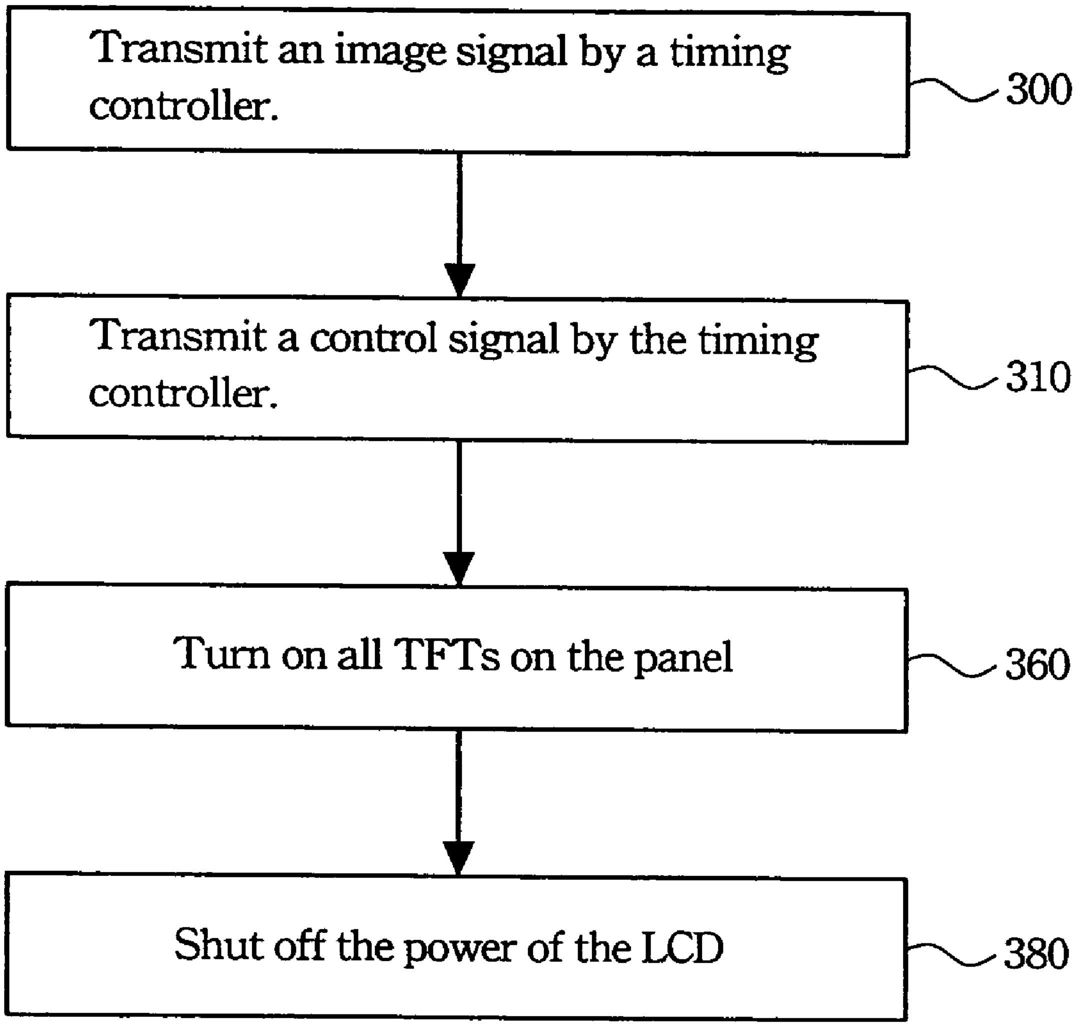
FIG. 3 illustrates a method flowchart for reducing the residual image effect of a liquid crystal display after the same is turned off in accordance with the preferred embodiment of the present invention.

FIG. 3 illustrates a method flowchart for reducing the residual image effect of the liquid crystal display after the same is turned off in accordance with the system mentioned above. Referring to FIG. 2 and FIG. 3, the system transmits 300 an image signal to the panel of the liquid crystal display by the timing controller 200 in the first period. The datum of the image signal is received and is written into the source driver 230 of the display array circuit. Arrays for the datum of the image signal are selected by the gate driver 220, and hence an image from the image signal displays on the panel. Additionally, the voltage of the image signal is substantially close to the voltage of a common voltage generator. For instance, a white image signal is transmitted when a normal white (NW) image displays on the panel without pressing a potential on the liquid crystal display. When a normal black (NB) image displays on the panel without pressing a potential on the liquid crystal display, a black image signal is transmitted. The difference in voltage 261, 263 between the thin film transistors and the common voltage generator is decreased owing to the voltage of the image signal being substantially close to the voltage of the common voltage generator. Therefore, the thin film transistors contain fewer residual charges, and less discharge time is consequently required.

In turn, the system transmits 310 a control signal to the gate driver 220 by the timing controller 200 in the second period, in order to turn on 360 all the thin film transistors on the panel. As a result, a plurality of residual charges in the thin film transistors may discharge via the source lines 235 before turning off 380 the power of the liquid crystal display. Hence the residual image effect caused by the slow discharge rate of the residual charges after power is turned off is diminished.

According to the aforementioned preferred embodiment of the present invention, the residual image effect after turning off the power of the liquid crystal display is greatly reduced because of fewer residual charges in the thin film transistors, less discharging time, and a faster discharge rate. Moreover, the method of reducing the residual image effect in accordance with the present invention is employed by controlling signals, which does not lead to any leakage current.

While the invention has been particularly shown and described with reference to the preferred embodiments thereof, these are, of course, merely examples to help clarify the invention and are not intended to limit the invention. It will be understood by those skilled in the art that various changes, modifications, and alterations in form and details may be made therein without departing from the spirit and scope of the invention, as set forth in the following claims.

What is claimed is:

1. A method for reducing the residual image effect of a liquid crystal display after turned off, comprising:

transmitting an image signal to the liquid crystal display by a timing controller after turning off a backlight of the liquid crystal display;

transmitting a control signal to the liquid crystal display by the timing controller after turning off the image data transmission; and turning on a plurality of thin film transistors on the liquid crystal display after turning off the image data transmission and before turning off the power of the liquid crystal display to discharge residual charges.

2. The method of claim 1, wherein the transmitting of an image signal is performed before turning off the image data transmission.

3. The method of claim 1, wherein the image signal comprises a white image signal.

4. The method of claim 1, wherein the image signal comprises a black image signal.

5. The method of claim 1, wherein the liquid crystal display further comprises a source driver and a gate driver.

6. The method of claim 5, wherein the gate driver is used to turn on the thin film transistors.

7. A method for reducing residual image effect applied to a liquid crystal display, comprising:

turning off a backlight of the liquid crystal display;

transmitting an image signal to the liquid crystal display by a timing controller;

turning off the image data transmission;

transmitting a control signal to the liquid crystal display by the timing controller;

turning on a plurality of thin film transistors on the liquid crystal display after turning off the image data transmission to discharge residual charges; and turning off a power to the liquid crystal display after turning on the thin film transistors.

8. The method of claim 7, wherein the image signal comprises a white image signal.

9. The method of claim 7, wherein the image signal comprises a black image signal.

10. The method of claim 7, wherein the liquid crystal display further comprises a source driver and a gate driver.

11. The method of claim 10, wherein the gate driver is used to turn on the thin film transistors on the liquid crystal display.

12. A system for reducing the residual image effect of a liquid crystal display after turned off, comprising:

a timing controller configured to transmit an image signal and a control signal;

a source driver electrically coupled with the timing controller, wherein the source driver further has a plurality of source lines;

a gate driver electrically coupled with the timing controller; and a plurality of thin film transistors electrically coupled to the source driver and the gate driver, wherein the timing controller transmits the image signal to the source driver in a time period causing a voltage of the thin film transistors to be substantially close to a voltage of a common voltage generator, and the timing controller transmits the control signal to the gate driver to turn on the thin film transistors after turning off the image data transmission and before turning off the power of the liquid crystal display such that residual charges are discharged via the source lines.

13. The system of claim 12, wherein the time period begins when a backlight of the liquid crystal display is turned off and ends when the image data transmission is turned off.

14. The system of claim 12, wherein the image signal comprises a black image signal.

15. The system of claim 12, wherein the image signal comprises a white image signal.

* * * * *